US008483108B2

(12) United States Patent
Whitby-Strevens

(10) Patent No.: US 8,483,108 B2
(45) Date of Patent: *Jul. 9, 2013

(54) APPARATUS AND METHODS FOR DE-EMPHASIS TRAINING ON A POINT-TO-POINT CONNECTION

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 1260 days.

This patent is subject to a terminal disclaimer.

(21) Appl. No.: 11/880,943

(22) Filed: Jul. 24, 2007

(65) Prior Publication Data

US 2008/0034137 A1    Feb. 7, 2008

Related U.S. Application Data

(60) Provisional application No. 60/833,138, filed on Jul. 24, 2006.

(51) Int. Cl.
*H04B 3/36* (2006.01)

(52) U.S. Cl.
USPC .......................................... 370/292; 370/338

(58) Field of Classification Search
USPC ... 370/292, 516, 332, 203; 455/13.4; 375/233
See application file for complete search history.

(56) References Cited

U.S. PATENT DOCUMENTS

| 4,156,798 | A | 5/1979 | Doelz |
| 4,194,113 | A | 3/1980 | Fulks et al. |
| 4,489,416 | A | 12/1984 | Stuart |
| 5,014,262 | A | 5/1991 | Harsharardhana |
| 5,274,631 | A | 12/1993 | Bhardwaj |
| 5,285,474 | A | 2/1994 | Chow et al. |
| 5,321,812 | A | 6/1994 | Benedict et al. |
| 5,343,461 | A | 8/1994 | Barton et al. |
| 5,394,556 | A | 2/1995 | Oprescu |
| 5,406,643 | A | 4/1995 | Burke et al. |
| 5,452,330 | A | 9/1995 | Goldstein |

(Continued)

FOREIGN PATENT DOCUMENTS

| EP | 1 085 706 | 3/2001 |
| EP | 1 085 706 | 10/2002 |

OTHER PUBLICATIONS

Bregni et al., Jitter Testing Technique and Results at VC-4 Desynchronizer Output of SDH Equipment, IEEE International Conference on Communications, vol. 3, pp. 1407-1410, May 12, 1994.
"Information technology—Microprocessor systems—Control and Status Registers (CSR) Architecture for microcomputer buses", ANSI/IEEE Standard 1212, The Institute of Electrical and Electronics Engineers, Inc. pp. I-122, 1994 Edition.

(Continued)

*Primary Examiner* — David Oveissi
(74) *Attorney, Agent, or Firm* — Gazdzinski & Associates, PC

(57) ABSTRACT

Methods and apparatus for achieving adaptive de-emphasis on a data network. In one embodiment, the network comprises a high-speed serialized bus network, and the invention is adapted to correct for inter-symbol interference (ISI) associated with data transmissions between two nodes communicating over the network. In one variant, a first device transmits a plurality of symbols to a second device. If the second device detects that these symbols have unacceptably degraded during transmission, it generates an interrupt during a designated interval that is subsequently transmitted to the first device, and used to either attenuate the signal strength associated with data transmissions to the second device, or undertake one or more remedial measures. In another embodiment, sequential calibration of nodes is achieved by executing a process adapted to identify an optimal de-emphasis level associated with data transmissions.

20 Claims, 14 Drawing Sheets

U.S. PATENT DOCUMENTS

| | | | |
|---|---|---|---|
| 5,490,253 A | 2/1996 | Laha et al. | |
| 5,495,481 A | 2/1996 | Duckwall | |
| 5,513,215 A * | 4/1996 | Marchetto et al. | 375/233 |
| 5,524,254 A | 6/1996 | Morgan et al. | |
| 5,533,048 A | 7/1996 | Dolan | |
| 5,533,062 A | 7/1996 | Liberti et al. | |
| 5,539,390 A | 7/1996 | Nagano et al. | |
| 5,541,670 A | 7/1996 | Hanai | |
| 5,568,641 A | 10/1996 | Nelson et al. | |
| 5,583,922 A | 12/1996 | Davis et al. | |
| 5,630,173 A | 5/1997 | Oprescu | |
| 5,632,016 A | 5/1997 | Hoch et al. | |
| 5,640,595 A | 6/1997 | Baugher et al. | |
| 5,642,515 A | 6/1997 | Jones et al. | |
| 5,654,657 A | 8/1997 | Pearce | |
| 5,659,581 A | 8/1997 | Betts et al. | |
| 5,684,715 A | 11/1997 | Palmer | |
| 5,701,476 A | 12/1997 | Fenger | |
| 5,701,492 A | 12/1997 | Wadsworth et al. | |
| 5,706,278 A | 1/1998 | Robillard et al. | |
| 5,712,834 A | 1/1998 | Nagano et al. | |
| 5,719,862 A | 2/1998 | Lee et al. | |
| 5,751,796 A | 5/1998 | Scott | |
| 5,754,765 A | 5/1998 | Danneels et al. | |
| 5,764,930 A | 6/1998 | Staats | |
| 5,784,648 A | 7/1998 | Duckwall | |
| 5,802,048 A | 9/1998 | Duckwall | |
| 5,802,057 A | 9/1998 | Duckwall et al. | |
| 5,802,365 A | 9/1998 | Kathail et al. | |
| 5,805,073 A | 9/1998 | Nagano et al. | |
| 5,809,331 A | 9/1998 | Staats et al. | |
| 5,826,027 A | 10/1998 | Pedersen et al. | |
| 5,832,298 A | 11/1998 | Sanchez et al. | |
| 5,835,761 A | 11/1998 | Ishii et al. | |
| 5,845,152 A | 12/1998 | Anderson et al. | |
| 5,867,730 A | 2/1999 | Leyda | |
| 5,875,301 A | 2/1999 | Duckwall et al. | |
| 5,917,853 A | 6/1999 | Greenblatt | |
| 5,923,633 A | 7/1999 | Ando | |
| 5,930,480 A | 7/1999 | Staats | |
| 5,935,208 A | 8/1999 | Duckwall et al. | |
| 5,938,764 A | 8/1999 | Klein | |
| 5,940,600 A | 8/1999 | Staats et al. | |
| 5,954,796 A | 9/1999 | McCarty et al. | |
| 5,968,152 A | 10/1999 | Staats | |
| 5,970,052 A | 10/1999 | Lo et al. | |
| 6,009,124 A | 12/1999 | Smith et al. | |
| 6,091,766 A | 7/2000 | Yoshida | |
| 6,178,497 B1 | 1/2001 | Frederick, Jr. | |
| 6,314,170 B1 | 11/2001 | Noguchi et al. | |
| 6,353,868 B1 | 3/2002 | Takayama et al. | |
| 6,356,558 B1 | 3/2002 | Hauck et al. | |
| 6,363,085 B1 | 3/2002 | Samuels | |
| 6,373,821 B2 | 4/2002 | Staats | |
| 6,385,679 B1 | 5/2002 | Duckwall et al. | |
| 6,405,247 B1 | 6/2002 | Lawande et al. | |
| 6,411,628 B1 | 6/2002 | Hauck et al. | |
| 6,418,150 B1 | 7/2002 | Staats | |
| 6,425,019 B1 | 7/2002 | Tateyama et al. | |
| 6,426,946 B1 | 7/2002 | Takagi et al. | |
| 6,426,962 B1 | 7/2002 | Cabezas et al. | |
| 6,442,630 B1 | 8/2002 | Takayama et al. | |
| 6,446,142 B1 | 9/2002 | Shima et al. | |
| 6,452,975 B1 | 9/2002 | Hannah | |
| 6,457,086 B1 | 9/2002 | Duckwall | |
| 6,466,982 B1 | 10/2002 | Ruberg | |
| 6,496,862 B1 | 12/2002 | Akatsu et al. | |
| 6,513,085 B1 | 1/2003 | Gugel et al. | |
| 6,519,657 B1 | 2/2003 | Stone et al. | |
| 6,529,522 B1 | 3/2003 | Ito et al. | |
| 6,574,588 B1 | 6/2003 | Shapiro et al. | |
| 6,587,904 B1 | 7/2003 | Hauck et al. | |
| 6,591,300 B1 | 7/2003 | Yurkovic | |
| 6,606,320 B1 | 8/2003 | Nomura et al. | |
| 6,618,750 B1 | 9/2003 | Staats | |
| 6,618,785 B1 | 9/2003 | Whitby-Streves | |
| 6,628,607 B1 | 9/2003 | Hauck et al. | |
| 6,636,914 B1 | 10/2003 | Johas Teener | |
| 6,643,714 B1 | 11/2003 | Chrysanthakopoulos | |
| 6,671,768 B1 | 12/2003 | Brown | |
| 6,718,497 B1 | 4/2004 | Whitby-Strevens | |
| 6,820,150 B1 * | 11/2004 | Joy et al. | 710/110 |
| 6,868,094 B1 * | 3/2005 | Bordonaro et al. | 370/516 |
| 6,879,630 B2 | 4/2005 | Kokuryo et al. | |
| 6,925,286 B1 * | 8/2005 | Kraiem et al. | 455/13.4 |
| 6,934,345 B2 | 8/2005 | Chu et al. | |
| 7,010,607 B1 | 3/2006 | Bunton | |
| 7,058,146 B2 | 6/2006 | Paulraj et al. | |
| 7,079,528 B2 | 7/2006 | Ziegler et al. | |
| 7,136,438 B2 | 11/2006 | Doi | |
| 7,155,249 B2 | 12/2006 | Sarkar et al. | |
| 7,184,708 B1 * | 2/2007 | Kwa et al. | 455/63.1 |
| 7,199,615 B2 | 4/2007 | Stojanovic et al. | |
| 7,236,451 B2 | 6/2007 | De Francesco et al. | |
| 7,502,338 B1 * | 3/2009 | Whitby-Strevens | 370/292 |
| 7,756,197 B1 * | 7/2010 | Ferguson et al. | 375/224 |
| 2001/0001151 A1 | 5/2001 | Duckwall et al. | |
| 2001/0019561 A1 | 9/2001 | Staats | |
| 2001/0024423 A1 | 9/2001 | Duckwall et al. | |
| 2002/0057655 A1 | 5/2002 | Staats | |
| 2002/0085581 A1 | 7/2002 | Hauck et al. | |
| 2002/0101231 A1 | 8/2002 | Staats | |
| 2002/0103947 A1 | 8/2002 | Duckwall et al. | |
| 2002/0122498 A1 * | 9/2002 | Dogan | 375/259 |
| 2002/0172226 A1 * | 11/2002 | Staats | 370/503 |
| 2002/0188780 A1 | 12/2002 | Duckwall | |
| 2002/0188783 A1 | 12/2002 | Duckwall et al. | |
| 2003/0003905 A1 * | 1/2003 | Shvodian | 455/423 |
| 2003/0016621 A1 * | 1/2003 | Li | 370/203 |
| 2003/0037161 A1 | 2/2003 | Duckwall et al. | |
| 2003/0055999 A1 | 3/2003 | Duckwall et al. | |
| 2003/0177436 A1 | 9/2003 | Gruhn et al. | |
| 2004/0213361 A1 | 10/2004 | Chen et al. | |
| 2004/0258020 A1 * | 12/2004 | Hayata | 370/331 |
| 2005/0134305 A1 | 6/2005 | Stojanovic et al. | |
| 2005/0213505 A1 | 9/2005 | Iochi et al. | |
| 2006/0067387 A1 | 3/2006 | Ahmed et al. | |
| 2006/0209762 A1 * | 9/2006 | Talmola et al. | 370/332 |
| 2007/0217341 A1 * | 9/2007 | Kawabata et al. | 370/252 |

OTHER PUBLICATIONS

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. I-384, approved Jul. 22, 1996.

Shiwen et al., Parallel Positive Justification in SDH C.sub.-4 Mapping, IEEE International Conference on Communications, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology—Fibre Channel—Methodologies for Jitter Specification", NCITS TR-25/1999, Jitter Working Group Technical Report, Rev. 10, pp. 1-96, Jun. 9, 1999.

P1394a Draft Standard for a High Performance Serial Bus (Supplement), Draft 3.0, Institute of Electrical and Electronics Engineers, Inc., pp. 1-187, Jun. 30, 1999.

IEEE Standard for a High Performance Serial Bus—Amendment 1, Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus—Amendment 2", Institute of Electrical and Electronics Engineers, Inc,, pp. 1-369, 2002 (no month).

\* cited by examiner

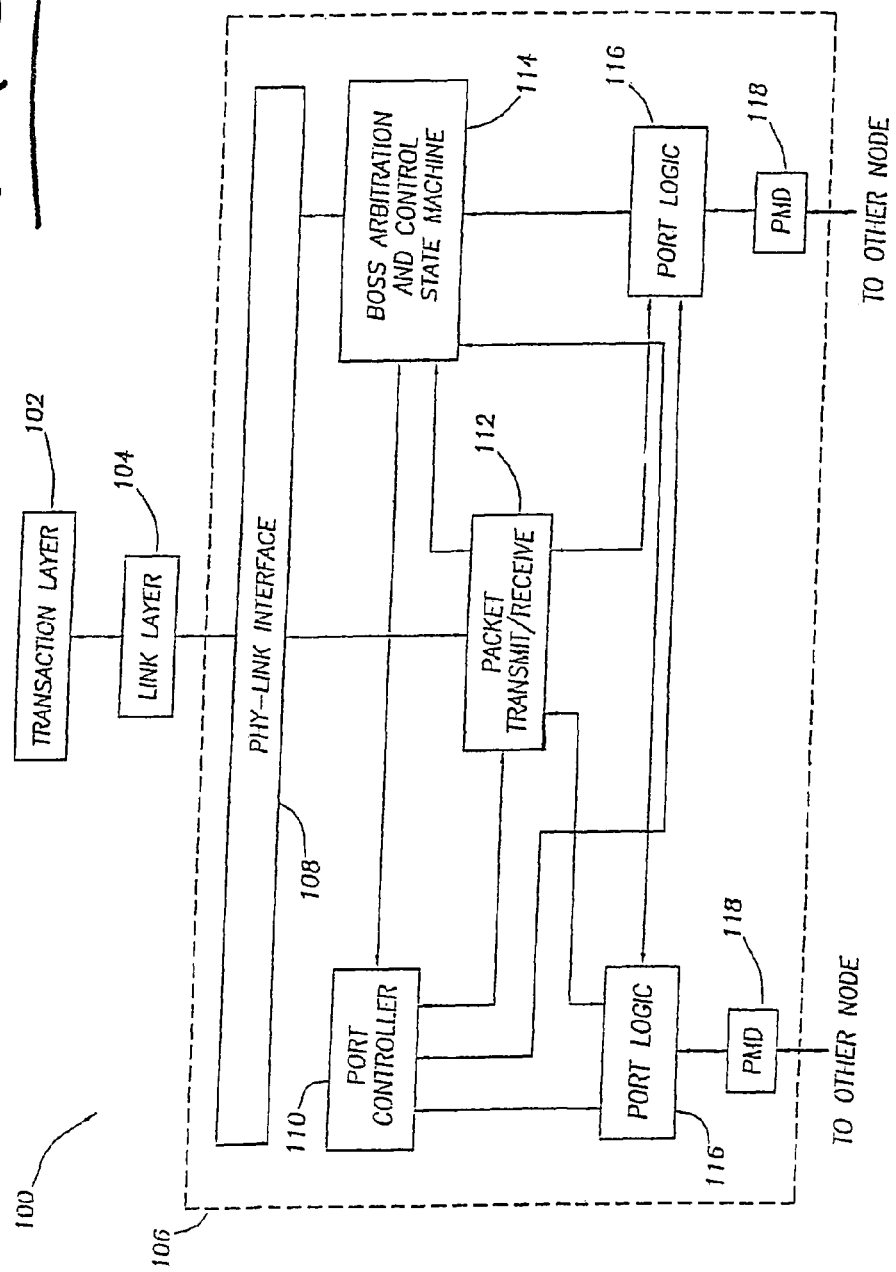

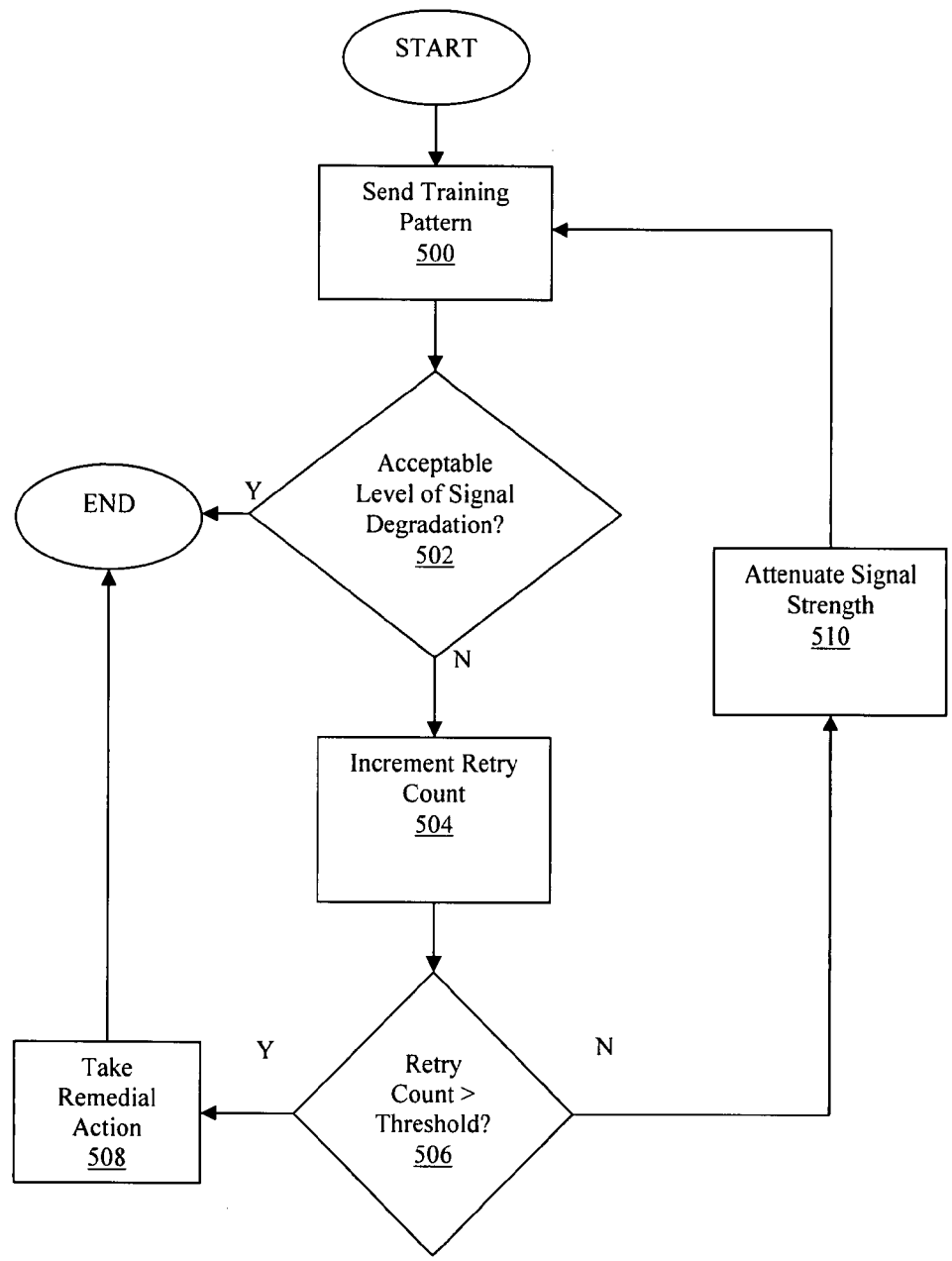

APPARATUS AND METHODS FOR DE-EMPHASIS TRAINING ON A POINT-TO-POINT CONNECTION

PRIORITY AND RELATED APPLICATIONS

The present application claims priority to U.S. provisional patent application Ser. No. 60/833,138 filed Jul. 24, 2006, entitled "DE-EMPHASIS TRAINING ON A POINT-TO-POINT CONNECTION", which is incorporated herein by reference in its entirety.

This application is related to co-owned U.S. Pat. No. 7,502,338 issued on Mar. 10, 2009 and entitled "DE-EMPHASIS TRAINING ON A POINT-TO-POINT CONNECTION", which is incorporated herein by reference in its entirety.

BACKGROUND OF THE INVENTION

1. Field of Invention

The present invention relates generally to data transmission between devices, such as on a data network. Specifically, in one exemplary aspect, the present invention relates to adaptive de-emphasis training of devices to facilitate data transmission between the devices.

2. Description of Related Technology

The IEEE 1394b serial bus protocol provides protocols and arbitration mechanisms for transmission speeds up to "S3200," which translates to 4 GBaud over a connecting cable due to 8B10B encoding.

However, the IEEE 1394b standard does not provide the details for the electrical signaling, due to lack of sufficient experience/evidence etc at the time the standard was prepared.

The electrical specifications for the IEEE 1394 family of protocols need to use some form of "de-emphasis" to overcome issues of inter symbol interference (ISI). ISI describes the degradation of signal quality on a transmission interference (ISI). More specifically, ISI describes the degradation of signal quality on a transmission line due to frequency-dependent attenuation within the transmission line (typically, higher frequencies are attenuated more than lower frequencies). This phenomenon is similar to an instance where bass notes from a loud in-car entertainment system can be heard as the car passes by, but no other music accompanying the bass can be heard. Usually, in digital transmission, a sequence of bits of the same value generates a lower frequency signal that affects the following bit if it is a single bit, and will therefore generate a higher frequency signal. The results are typically measured at the receiver by means of an eye diagram of the type known in the art (see, e.g., FIG. 1 of U.S. Pat. No. 6,718,497 discussed subsequently herein) that overlays a large number of received signals, aligned such that the center of the bit time for each signal is coincident. If there is no signal degradation, at the center time all the signals will be high or low (depending on whether a "1" bit or a "0" bit is being transmitted), resulting in a wide-open "eye." If signal degradation occurs, then at the center of the bit time some of the signals will not be so high or low, and the eye will therefore be less open. If the eye is fully closed, then it is impossible to determine whether the transmitted bits are 1 or 0 without at least some contextual information.

De-emphasis is a technique in which a PHY's transmitter modifies the amplitude signal for various run-lengths of multiple identical bits so that the signal as received at the receiver is free of apparent ISI. Essentially, the transmitter pre-compensates for the ISI that is introduced as the signal traverses the cable. There is an alternative technique of equalization in the receiver that applies to DSP techniques for extracting contextual information, but for various technical reasons, this technique is less favored.

The amount of de-emphasis to apply in any particular case is likely to depend on the attenuation properties of the particular cable being used. With very short cables, there may be little or no de-emphasis required, whereas with long cables a considerable amount of de-emphasis may be appropriate. The consequence is that it is necessary to perform some form of training of the transmitter when a connection is established. Such training enables the transmitter to determine how much de-emphasis to apply for the actual cable being used in the connection. The use of de-emphasis determined as the result of analysis of the particular connection is generally known as "adaptive de-emphasis."

At relatively low transmission rates, nodes communicating over such serial buses do not need to correct for inter-symbol interference (ISI) associated with data transmissions among the nodes. At somewhat faster transmission rates, a corrective technique known as "fixed de-emphasis" is adequate. But for higher performance and more robust connection among the nodes, an "adaptive de-emphasis" approach would be preferred.

Presently, there is no effective adaptive de-emphasis method in existence, because training has heretofore proven to be especially difficult and complex. In fact, in the exemplary context of IEEE Std. 1394, this was one reason why there was no specification included in the 1394b Standard for signaling at the S3200 rate. One approach has been to utilize the existing connection negotiation signaling in 1394b. In such an approach, a receiving node analyzes the signal (including what are referred to as "connection tones") to determine the amount of desired de-emphasis. However, this approach suffers significant shortcomings.

First, each tone comprises a relatively low frequency signal. Thus, the bit patterns sent during the existing connection negotiation signaling are not suitable for analysis to determine the amount of high frequency attenuation inherent in the transmission line (and hence the amount of de-emphasis to be applied), as they are of too low a frequency.

Second, even if such analysis could be performed by the receiver, there is no way to communicate the result of any such analysis to the transmitter.

Accordingly, a need currently exists for a de-emphasis training method and apparatus that effectively yield a robust connection between various nodes communicating over a network, such as for example a 1394-compliant high-speed serial bus. More specifically, a need exists for a de-emphasis training mechanisms that utilize bit patterns which are suitable for meaningful analysis by a receiving node, and wherein the training mechanism includes a means allowing for communication of the results of the analysis to the transmitting node.

SUMMARY OF THE INVENTION

The present invention addresses the foregoing issued by providing, inter alia, adaptive de-emphasis training between a transmitting node and a receiving node.

In one aspect, the invention provides a method for establishing data transmission between a two devices by performing de-emphasis training. In one embodiment, the method comprises: while a retry count does not exceed a predetermined threshold: sending with a signal strength a training pattern from a first device to a second device; receiving negative acknowledgement from the second device within enough time to determine that the send training pattern was unacceptable to the second device; incrementing a retry count; and attenuating the signal strength; and if the retry count exceeds the predetermined threshold, then perform remedial action to improve data transmission between the first and second devices.

In another embodiment, the method comprises: while a training pattern counter does not exceed a predetermined threshold: sending a training pattern from a first device to a second device; verifying the absence of a negative acknowledgement sent from the second device; incrementing a training pattern counter; and modifying the training pattern.

In yet another embodiment, the method comprises: while a training pattern counter does not exceed a predetermined threshold: sending a training pattern from a first device to a second device; verifying the absence of a negative acknowledgement sent from the second device; incrementing a training pattern counter; and modifying the training pattern.

In still another embodiment, the method comprises: a) performing speed negotiation between a first device and a second device; b) synchronizing the first and second devices; c) selecting a de-emphasis training pattern and de-emphasis level; d) until all de-emphasis training patterns to be sent from the first device to the second device are sent: 1) until all de-emphasis levels to be tried for a given training pattern have not been sent from the first device to the second device: i) transmitting the de-emphasis pattern from the first device to the second device at the selected de-emphasis level; ii) analyzing an incoming bit stream to determine signal quality; iii) changing de-emphasis level for the training pattern; and iv) resending the training pattern with the changed de-emphasis level; 2) changing the de-emphasis pattern to be sent; e) setting an acceptable de-emphasis level based on the analyzed bit streams; and f) transmitting symbols from the first device to the second device using the acceptable de-emphasis level.

In a further embodiment, the method comprises: a) performing speed negotiation between a first device and a second device; b) synchronizing the first and second devices; c) selecting a de-emphasis training pattern and de-emphasis level; d) until all de-emphasis training patterns to be sent from the first device to the second device are sent: 1) until all de-emphasis levels to be tried for a given training pattern have not been sent from the first device to the second device: i) transmitting the de-emphasis pattern from the first device to the second device at the selected de-emphasis level; ii) analyzing an incoming bit stream to determine signal quality; iii) unless the analysis identifies an acceptable de-emphasis level, changing de-emphasis level for the training pattern and resending the training pattern with the changed de-emphasis level; 2) resetting the de-emphasis level changing the de-emphasis pattern to be sent; e) setting an acceptable de-emphasis level based on the analyzed bit streams; and f) transmitting symbols from the first device to the second device using the acceptable de-emphasis level.

In a second aspect of the invention, a method for use by a first device in communication with a second device via a serial bus is disclosed. In one embodiment, the method comprises: transmitting a plurality of symbols to the second device; monitoring for an interrupt during a first interval, the interrupt indicating to the first device that at least a portion of the plurality of symbols degraded during transmission to the second device; and if the interrupt was received at the first device during the first interval, attenuating the signal strength associated with data transmissions from the first device to the second device.

In another embodiment, the method comprises: receiving a plurality of symbols from the first device; determining whether at least a portion of the plurality of symbols has degraded during transmission; and if the at least portion of the plurality of symbols has degraded during transmission, transmitting an interrupt to the first device during a first interval.

In still another embodiment, the method comprises: sending with a first signal strength a training pattern from a first device to a second device; receiving negative acknowledgement from the second device within enough time to determine that the sent training pattern was unacceptable to the second device; attenuating the signal strength; and sending with the attenuated signal strength a training pattern from the first device to a second device.

In a third aspect of the invention, a method for achieving de-emphasis training of a first node and a second node in a data network is disclosed. In one embodiment, the method comprises: having the first node transmit each bit pattern of a plurality of bit patterns to the second node at one or more de-emphasis levels; having the second node determine a first set of optimal de-emphasis levels each corresponding to a particular bit pattern from the plurality of bit patterns; and selecting from among the first set of optimal de-emphasis levels a target de-emphasis level known to be operable with respect to each bit pattern in the plurality.

In a fourth aspect of the invention, a method of performing calibration of a first node communicating with a second node over a network is disclosed. In one embodiment, the method comprises: executing a process to identify a first optimal de-emphasis level, the process comprising: transmitting the first node transmit a plurality of symbols to the second node at a first de-emphasis level; determining whether the plurality of symbols had unacceptably degraded during the transmission; and if the plurality of symbols had unacceptably degraded during the transmission, selecting a second de-emphasis level, and repeating the process until no unacceptable degradation occurs.

In a fifth aspect of the invention, computerized apparatus adapted to implement one or more of the foregoing methods is disclosed. In one embodiment, the apparatus is adapted for use in a high-speed serial network (such as that compliant with IEEE Std. 1394a or 1394b), and comprises: a processor; a storage device in data communication with the processor, and at least one computer program disposed on the storage device and adapted to implement the desired method(s).

In a sixth aspect, a computer readable apparatus is disclosed. In one embodiment, the apparatus comprises a computer-readable medium with one or more computer programs stored thereon, the programs adapted to implement the foregoing methods within a data network.

In a seventh aspect, a data network is disclosed. In one embodiment, the network comprises a high-speed serialized bus protocol network comprising a plurality of nodes. The nodes are adapted to communicate and calibrate according to the foregoing methods.

In various embodiments, the methods of the present invention are implemented on devices that are operable on a wide variety of serial or parallel point-to-point electrical connections. Other features and advantages of the present invention will become apparent to one skilled in the art upon reading the detailed description below, when considered in conjunctions with the accompanying drawings.

BRIEF DESCRIPTION OF THE DRAWINGS

FIG. 2 is a block diagram illustrating in greater detail a node device depicted in FIG. 1;

FIG. 5 is a flow diagram illustrating a first sequence of de-emphasis training where signal deterioration is asymmetric;

DETAILED DESCRIPTION OF THE INVENTION

Figure 1:
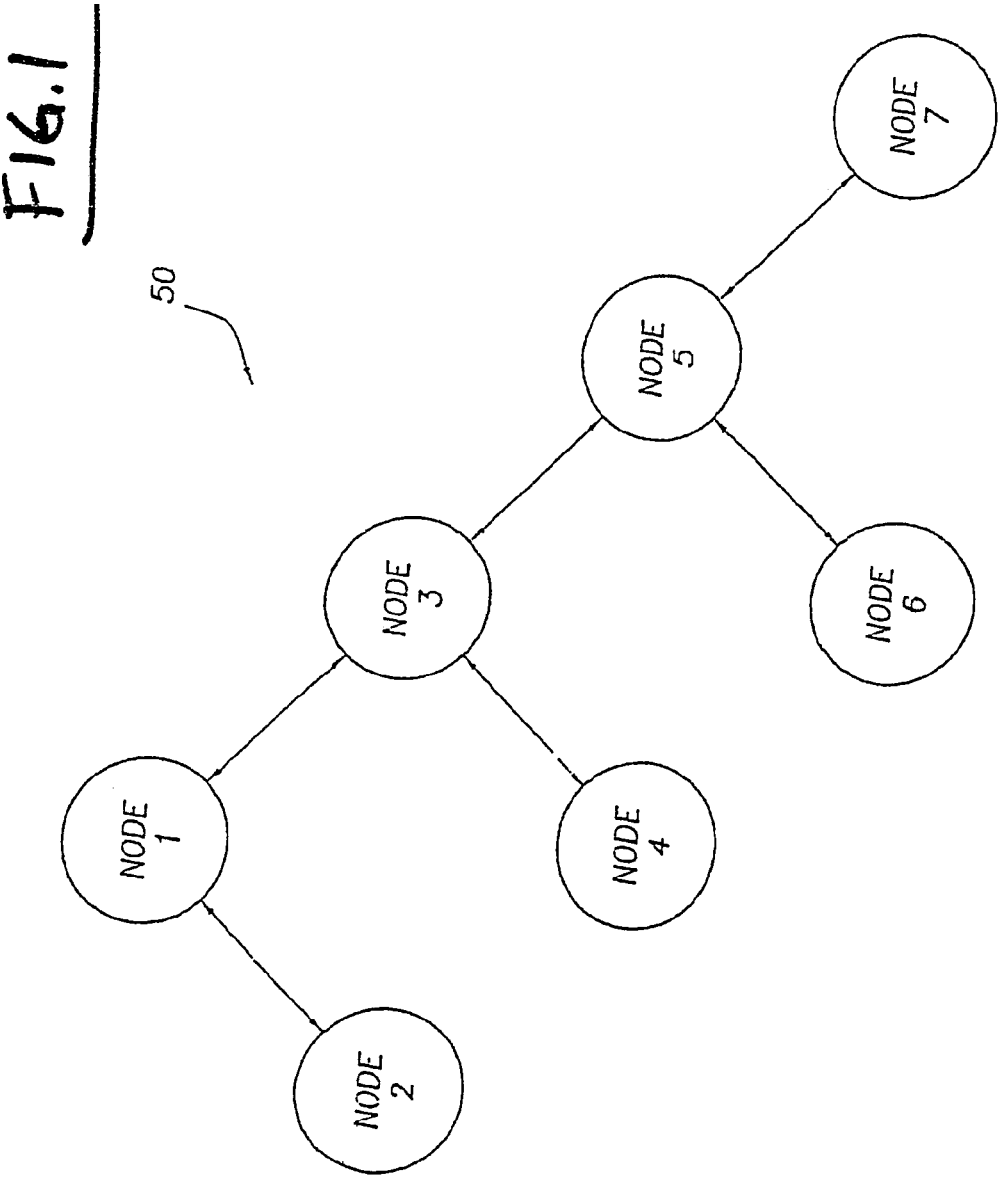
FIG. 1 is a block diagram of an exemplary network of node devices utilized in various embodiments of the present invention.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of telecommunications or data network including, without limitation, data networks (including MANs, WANs, LANs, WLANs, internets, intranets, and ad hoc networks), telco networks, and wireless networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., IEEE Std. 1394, SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, WiFi (802.11a,b,g,n), WiMAX (802.16), PAN (802.15), or IrDA families.

As used herein, the term "node" refers without limitation to any location, functional entity, or component within a network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides methods and apparatus which allow for training across a data link so as to mitigate the effects of inter-symbol interference (ISI).

As mentioned above, at relatively low transmission rates, so-called "de-emphasis" techniques are not required, since ISI is effectively inconsequential. At somewhat faster transmission rates, fixed de-emphasis is generally adequate. But for yet higher performance, a connection requires some form of adaptive de-emphasis. Furthermore, a connection is advantageously much more robust with some form of adaptive de-emphasis.

The present invention provides methods and apparatus which effectively implement adaptive de-emphasis among the nodes of a network, such as one utilizing a high-speed serialized bus protocol network. In one exemplary embodiment, the present invention provides a set of training bit patterns and a protocol that allows a receiving node to communicate to a transmitting node the quality of the signal is which it is currently receiving. The transmitting node varies the amount of de-emphasis that it applies, and selects an optimal amount according to the feedback received from the receiver.

Techniques and apparatus utilized by the present invention are especially suitable for a wide variety of serial or parallel point-to-point electrical connections. In the exemplary context of the IEEE 1394b standard, communication between a port on one device and a port on another device takes place in both directions simultaneously and independently. It is necessary to achieve reliable communications in both directions, and training may advantageously proceed in both directions simultaneously (when a new connection is made, or after the second of the two ports is powered on or otherwise enabled) according to the present invention.

DETAILED DESCRIPTION OF EXEMPLARY EMBODIMENTS

Referring now to FIGS. 1-10, exemplary embodiments of the methods and apparatus of the present invention are described in detail. It will be appreciated that while the following description is cast primarily in terms of a high-speed serialized bus protocol (i.e., the IEEE 1394b Standard), the invention is in no way so limited. For example, other bust protocols may be used (serialized or otherwise), and different network topologies and interface mediums (including without limitation wireless links) may be employed for certain of the functions described herein.

It can also be appreciated that the methods of the present invention may be practiced using any configuration or combination of hardware, firmware, or software, and may be disposed within one or any number of different physical or logical entities. For example, the logical processes described below (including various de-emphasis and calibration control function) may take the form of one or more computer programs, such as may be disposed in a memory or storage device (including a computer-readable storage apparatus). Alternatively, such computer programs may have one or more components distributed across various hardware environments at the same or different locations, such as where these logical processes are distributed across multiple platforms on the network.

As yet another example, portions of the functionality may be rendered as a dedicated or application specific IC having code running thereon. Myriad different configurations for practicing the invention will be recognized by those of ordinary skill in the network arts provided the present disclosure, the following being merely exemplary.

Referring to FIG. 1, an exemplary IEEE 1394 network 50 comprises one or more "nodes," (nodes 1-7). A node represents an electronic device(s) with an IEEE 1394 bus interface. A node device may comprise a computer, a digital camera, a digital video recorder, a DVD player, or another type of device having a suitable bus interface. Each node couples to at least one other node. As shown in the exemplary architecture of FIG. 2, node 1 couples both to nodes 2 and 3. Node 3, in turn, couples to nodes 4 and 5, and node 5 couples to nodes 6 and 7. In general, each node can transmit data to any other node in the network. For example, node 7 can transmit data to node 2, but the transmitted data will ultimately pass from node 7 to node 5, to node 3, to node 1, and finally, to node 2.

Referring to FIG. 2, the exemplary node 100 generally comprises three layers: transaction layer 102, link layer 104 and physical layer 106 (referred to as a "PHY 106"). Transaction layer 102 implements the request-response protocol required to conform to the IEEE 1394 standard in accordance with known techniques. Link layer 104 supplies an acknowledgment to the transaction layer. Link layer 104 handles all packet transmission and reception responsibilities as well as the provision of cycle control for isochronous channels. The PHY 106 generally provides the initialization and arbitration services necessary to assure that only one node at a time is sending data and to translate the serial bus data stream and signal levels to those required by the link layer logic 104. PHY 106 also implements the arbitration scheme of the preferred embodiment of the invention.

Feedback training is utilized in embodiments of the present invention where signal deterioration is asymmetric; i.e., the signal degradation in one direction is different from the signal degradation in the opposite direction. In this case, the amount of de-emphasis to be applied at the transmitter for communication in one direction will be different from the de-emphasis to be applied at the transmitter for the opposite direction.

Figure 3A:
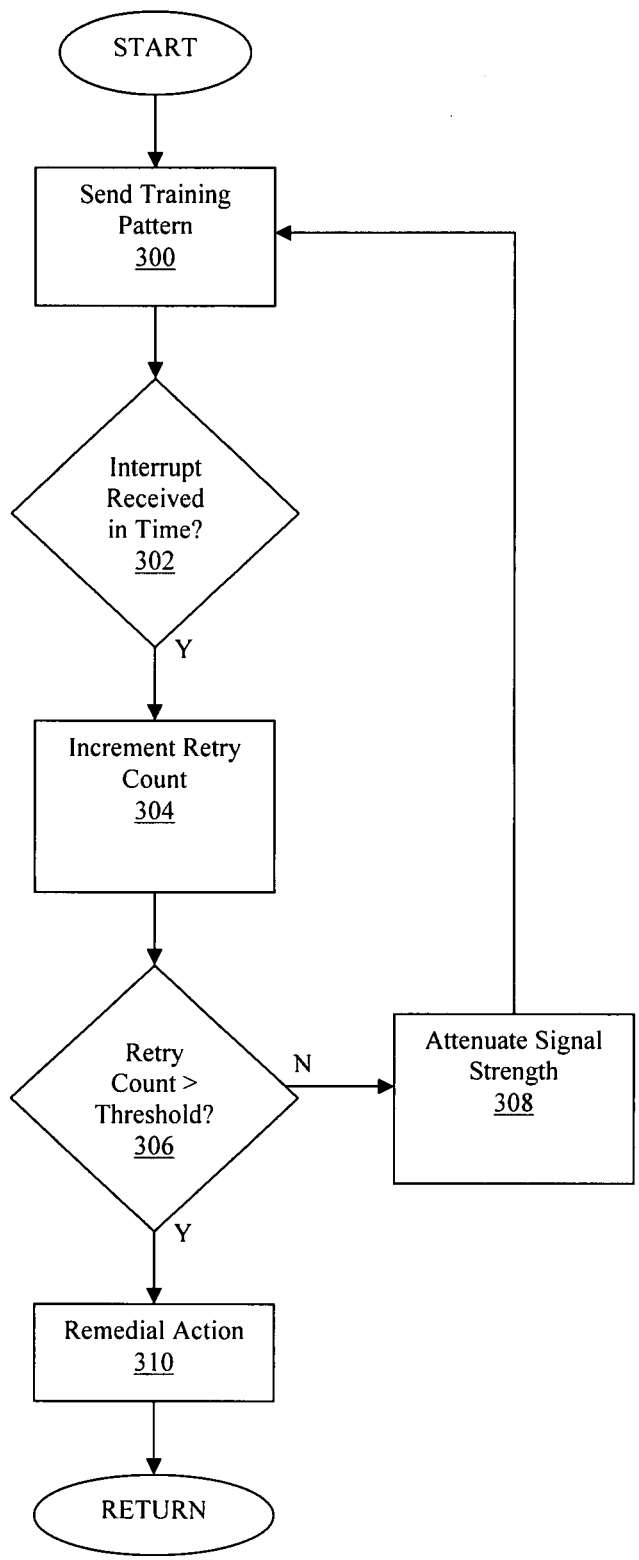
FIG. 3A is a flow diagram illustrating a first sequence of de-emphasis training utilizing interrupts where signal deterioration is asymmetric.

Directing attention to FIG. 3A, according to an embodiment of the present invention, a node transmits a particular training pattern for an arbitrary number (n) of symbols (step 300), but the receiving node, if it decides that the eye is insufficient, interrupts its transmission of a training pattern and transmits a small number of bytes of negative acknowledgement (NACK). In a preferred embodiment, the NACK appears as a series of alternating bits. In certain variants, between approximately two and four symbols are sufficient for this NACK. In some embodiments, the NACK symbol is chosen so that it is recognizable as such, despite the maximum amount of ISI to be tolerated, and so it can always be distinguished from the ISI training patterns. This is not to say that it has to be received correctly, but rather the NACK symbol is capable of being distinguished from other patterns used for training received across the range of ISI to be tolerated. Possible choices include without limitation 10101010, or a pattern with no high frequency content, such as 11110000, or 1111111111 followed by 0000000000. It should be noted that it is often important to maintain DC balance to avoid excessive baseline wander, thus the NACK should ideally have the same number of ones as zeros.

If the interrupt is received within a predetermined amount of time (decision step 302), control proceeds to step 304, where a retry count is incremented. In an embodiment, the receiving node sends the interrupt before approximately half of the 11 symbols are received, so that the transmitting node will receive this feedback before it completes the transmission of the entire set of n symbols. The lack of any such feedback within this time allows the transmitting node to assume that the correct amount of de-emphasis is being applied. In another embodiment, a value based on round trip time, determined by an extension to this protocol which first sends a test signal and measures the time for a response plus a few clocks, can be substituted for the value represented by half of the n symbols to allow enough time for the transmitter to receive the feedback. The receiving node then resumes transmitting the training pattern it was previously transmitting to allow training to be continued in the opposite direction.

At decision step 306, if the retry counter value is less than a predetermined threshold, control transitions to step 308, where the transmitting changes its de-emphasis attenuation of the training pattern. Control returns to step 300, where the training pattern is sent again. In an embodiment utilizing the S3200 speed mode of the IEEE 1394b serial bus protocol, three pre-determined levels of de-emphasis cover all possible amounts of signal attenuation from compliant cables. The transmitter can then pick a value that has been untried. In other embodiments, preset values may be appropriate. Control loops through steps 300-308 until the retry counter value exceeds a threshold value, at which time control transitions to step 310, where the connection is deemed unreliable and remedial action is taken. Remedial action can include lowering the transmission speed, reporting failure to management software, triggering a timeout interval, and the like.

Figure 3B:
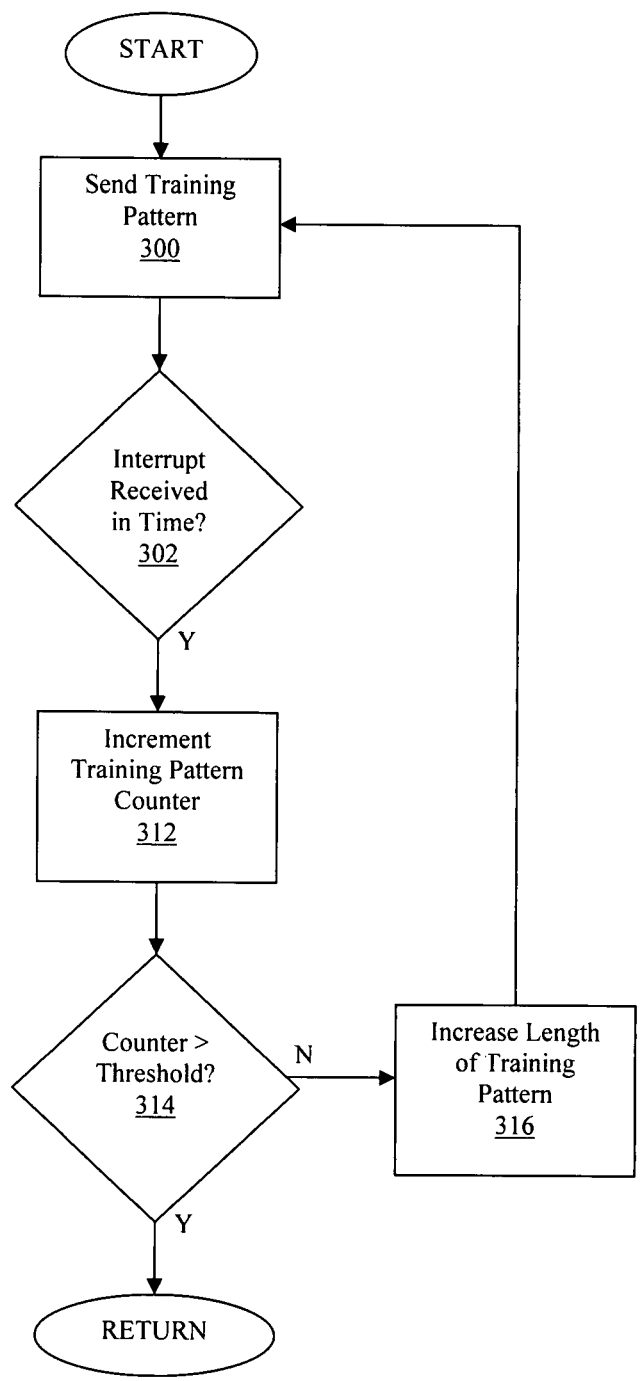
FIG. 3B is a flow diagram illustrating a second sequence of de-emphasis training utilizing interrupts where signal deterioration is asymmetric.

Directing attention to FIG. 3B, in another embodiment, if the node transmitting a particular training pattern does not receive a NACK by the time it has completed transmitting n symbols (decision step 302), then it increments a training pattern counter at step 312. If the training pattern counter does not exceed a predetermined threshold value (decision step 314) the length of the training pattern is increased (step 316) and control returns to step 300, where the longer training pattern is transmitted. Control loops through steps 300-314 until the training pattern counter value exceeds the threshold value, at which time training is complete. The transmitting node then begins transmission of normal 1394b symbols. In an embodiment, training continues until the transmitting node decides that the receiving node has also trained its transmitter. This determination is made because the incoming signal is deemed acceptable and the receiving node has not had to send a NACK. In this embodiment, feedback is provided in two directions and can be different for each direction.

Figure 3C:
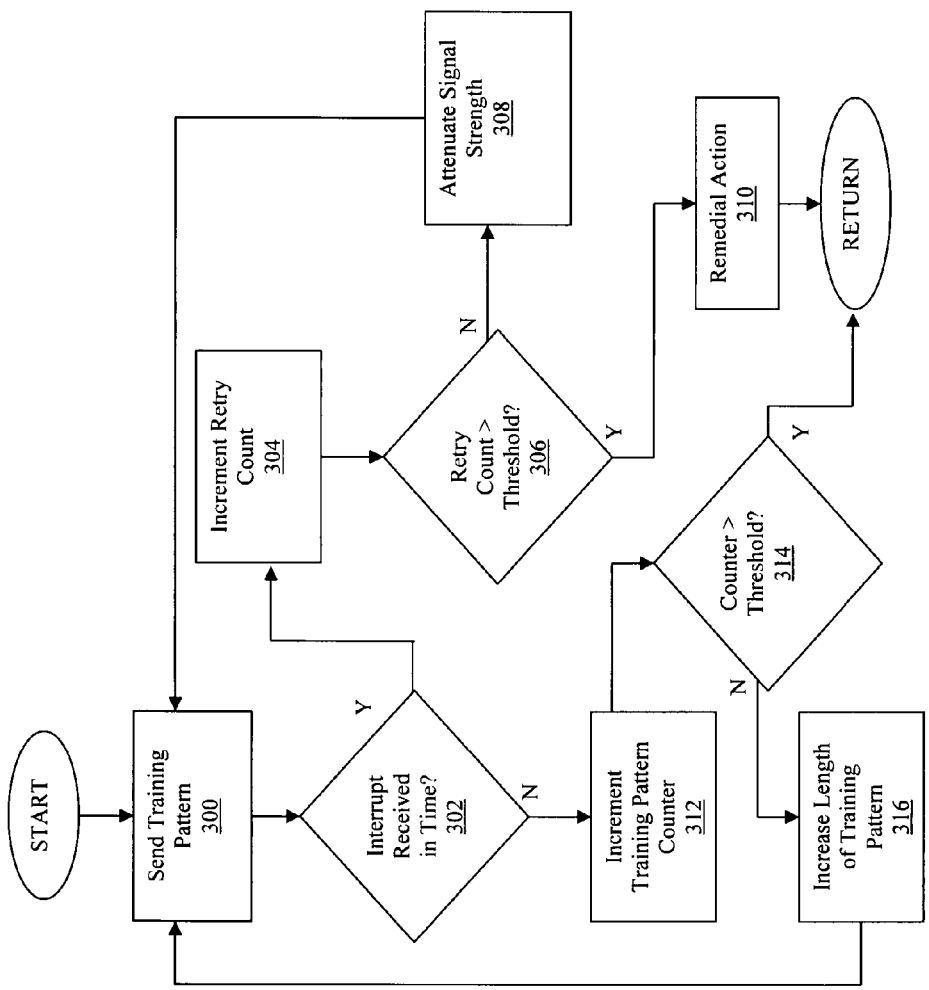
FIG. 3C is a flow diagram illustrating a third sequence of de-emphasis training utilizing interrupts where signal deterioration is asymmetric.

In one embodiment, after interrupting a particular training pattern with a NACK, the training pattern is restarted, so the receiving node has a complete contiguous set of symbols on which to examine the eye. In another embodiment, the methods illustrated in FIGS. 3A and 3B can also be combined as illustrated in FIG. 3C.

FIG. 5 illustrates an embodiment of the present invention which does not necessarily rely on the use of interrupts or NACKS generated by the receiving node in order to notify the transmitting node of a degraded signal. In step 500, a training pattern comprising a plurality of symbols is sent from the transmitting node to the receiving node. Upon receiving this pattern, the receiving node determines at step 502 whether the signal transmitted comprises an acceptable level of signal degradation. This can be accomplished in a variety of ways, for instance, by comparing each received bit in the transmission stream to each bit that was expected to be received. Upon comparing the received pattern to the expected pattern, if the receiving node determines that the received pattern contains an acceptable level of signal degradation (for example, as given by a fraction or percentage compared when compared against a desired level), the de-emphasis training has completed successfully and the process ends. On the other hand, if the receiving node determines that the pattern degraded too much during transmission, the process continues per step 504.

In accordance with one exemplary embodiment, a retry count stored in memory at the transmitting node represents the number of times the transmitting node has sent the training pattern to the receiving node. Additionally, a threshold variable also stored in memory at the transmitting node represents the number of times that the transmitting node should send out the training pattern before halting transmission and taking some form of remedial action.

If the comparison is unsuccessful (i.e., there was too much signal degradation during transmission), the retry count is incremented at step 504. The retry count is then compared against the threshold at step 506. If the retry count is less than or equal to the threshold, the transmitting node attenuates its signal strength at step 510, and the process repeats at step 500. Likewise, if the retry count is greater than the threshold, remedial action is taken at step 508. As mentioned earlier, remedial action may include any number of responses, such as e.g., lowering the transmission speed, changing de-emphasis level, reporting failure to management software, triggering a timeout interval, or various combinations thereof. Furthermore, such remedial action may be performed at either (or both) of the transmitting node and the receiving node.

Figure 6:
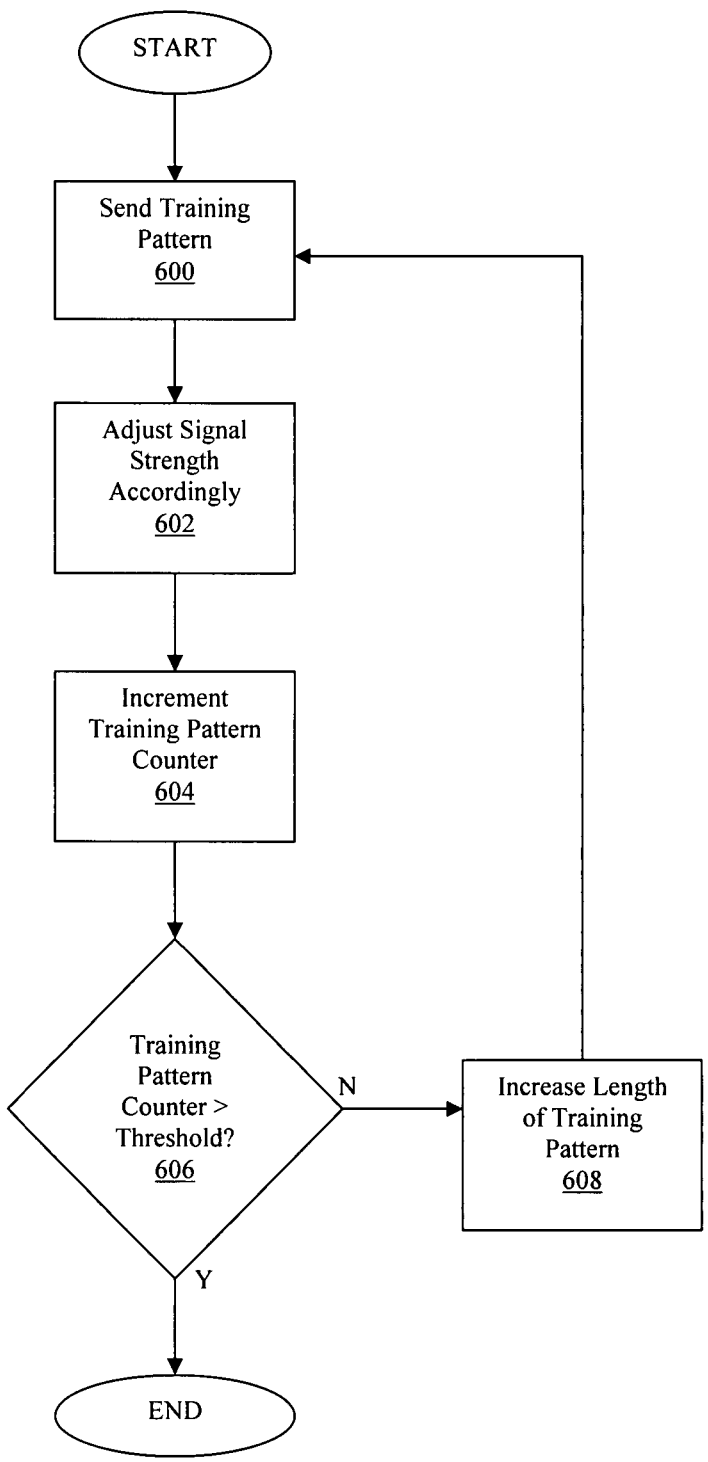
FIG. 6 is a flow diagram illustrating a second sequence of de-emphasis training where signal deterioration is asymmetric.
Figure 7:
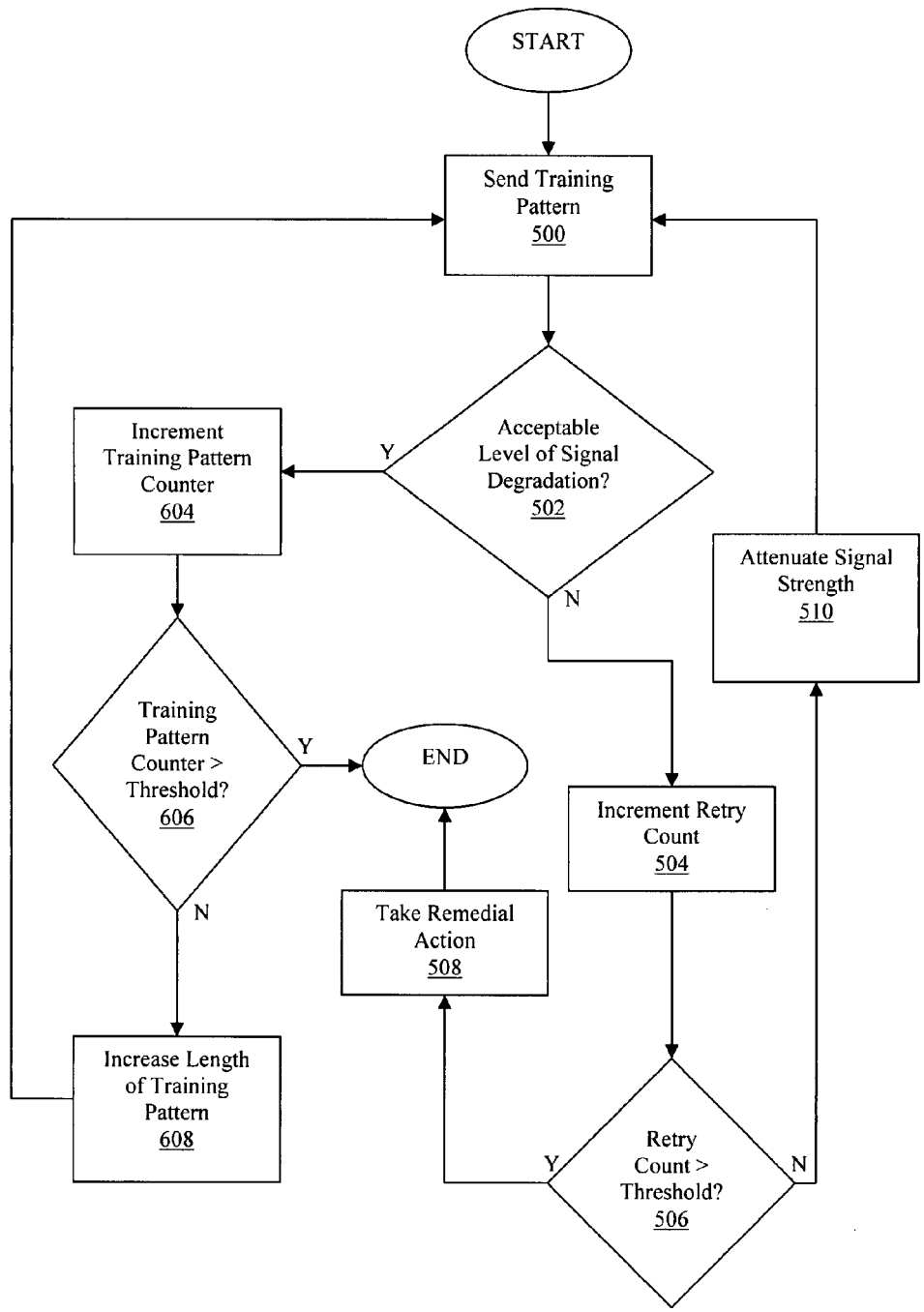
FIG. 7 is a flow diagram illustrating a third sequence of de-emphasis training where signal deterioration is asymmetric.

FIG. 6 illustrates another embodiment of the present invention which does not rely on the use of interrupts generated by the receiving node in order to signal to the transmitting node that a signal has unacceptably degraded during transmission. The embodiment shown in FIG. 6 illustrates a stepwise approach to testing various training patterns of progressively increasing pattern lengths, although it will be appreciated that other patterns may be used with equal success.

At step 600, the transmitting node sends out a training pattern to the receiving node. The signal strength is adjusted accordingly per step 602. In one embodiment, this adjustment is accomplished by the process described by FIG. 5 and accompanying text (note that the combination of these processes is further illustrated by FIG. 7 herein).

In certain embodiments, the training pattern counter comprises a value for which the length of the current training pattern functionally depends, while the threshold represents a value corresponding to the longest training pattern that the transmitting node will test before ending the training process. Thus, once the signal strength has been adjusted with respect to the current training pattern, the training pattern counter is incremented at step 604 and then compared against the threshold at step 606. If the training pattern counter is greater than the threshold, there are no more training patterns to test, and so the process ends. On the other hand, if the training pattern counter is less than or equal to the threshold, the length of the training pattern is increased at step 608, and the process then repeats per step 600. Advantageously, this allows signal strength to be adjusted more rapidly on shorter training patterns, yet fine-tuned to achieve a greater degree of precision as the training pattern gets progressively longer.

Note also that in certain embodiments, the transmitting node may transfer a variety of test patterns (i.e. different bit streams) of the same length before a different pattern is selected and the training pattern length is increased.

Figure 4A:
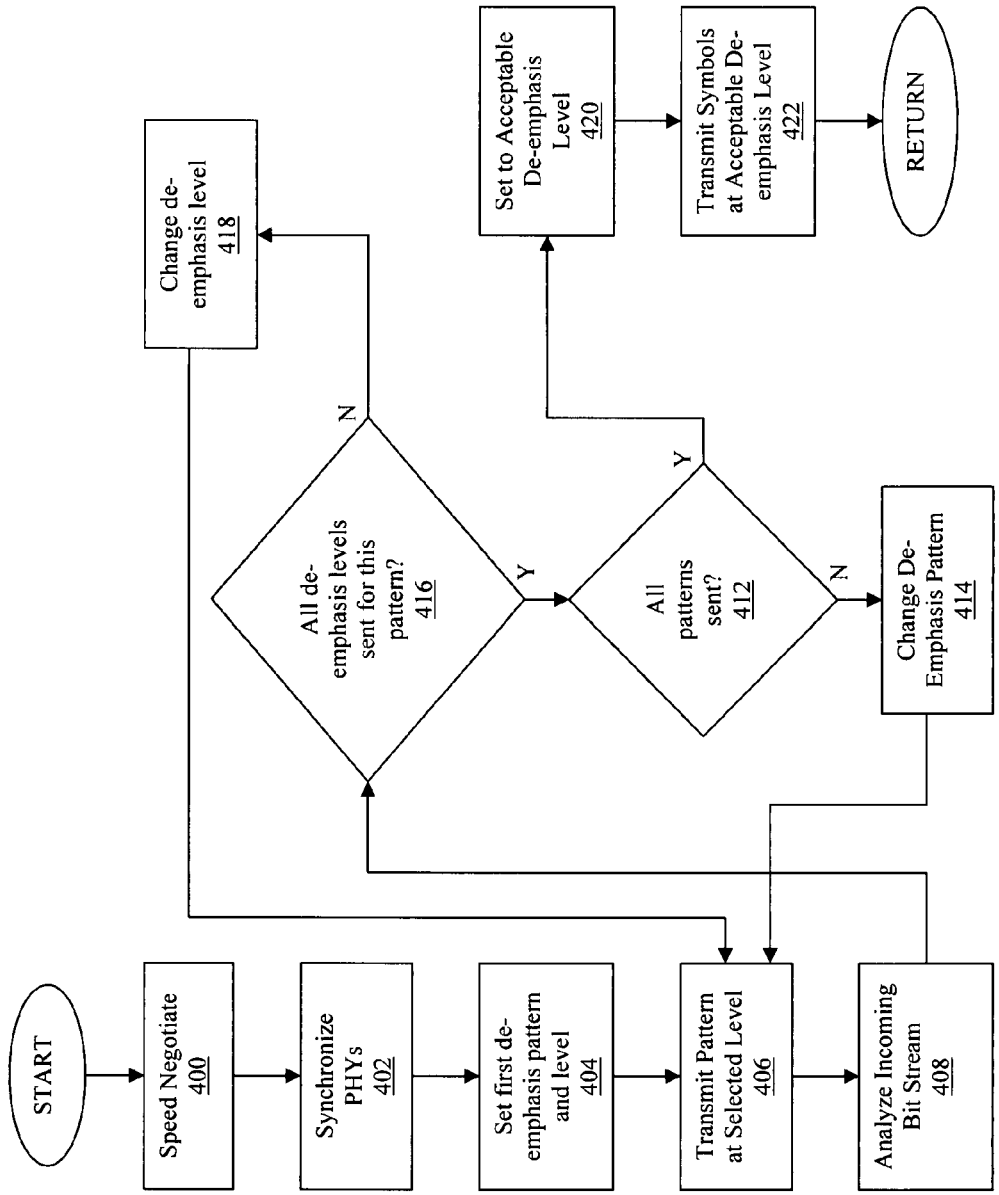
FIG. 4A is a flow diagram illustrating a first sequence of de-emphasis training where signal deterioration is substantially symmetric.
Figure 4B:
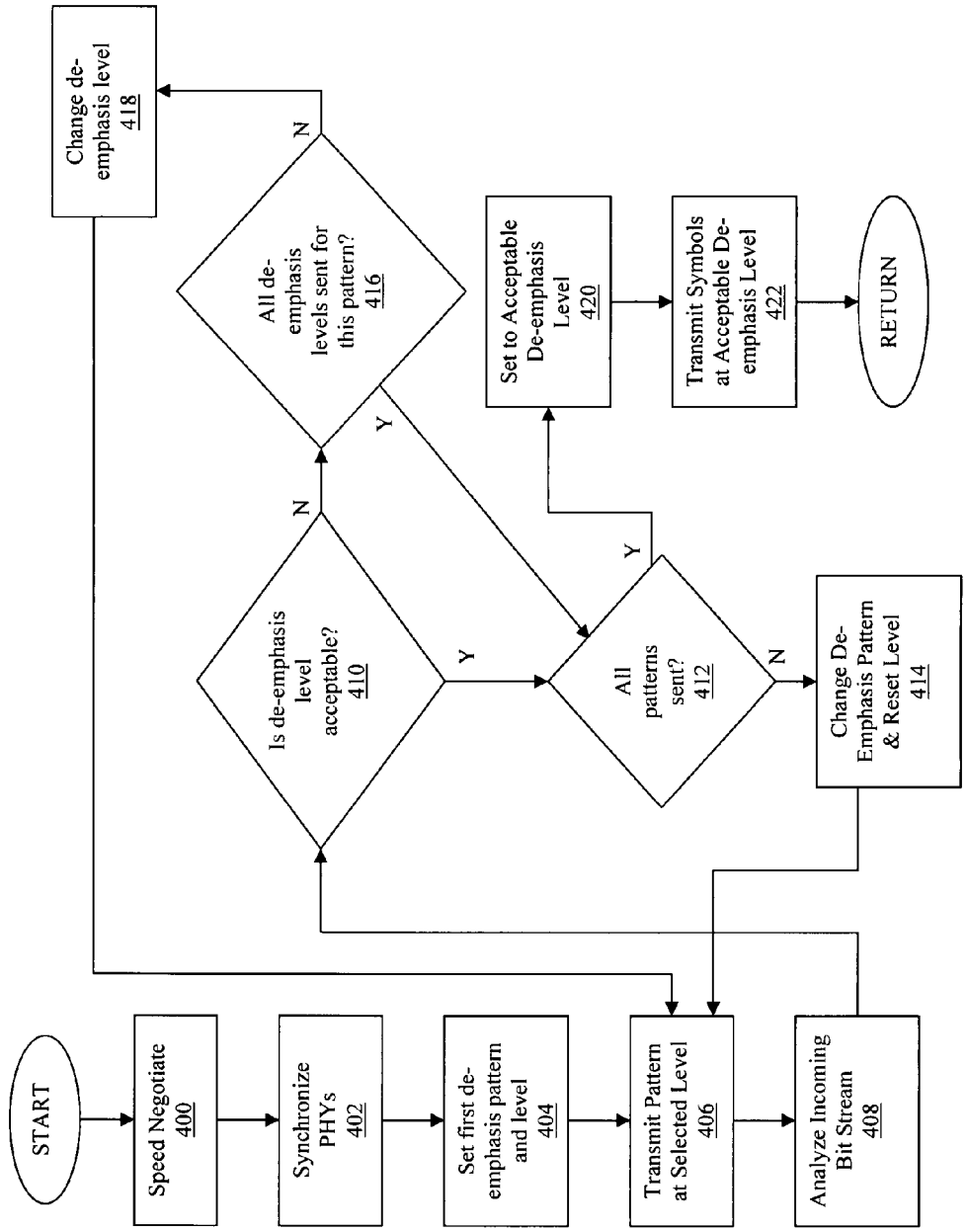
FIG. 4B is a flow diagram illustrating a second sequence of de-emphasis training where signal deterioration is substantially symmetric.

Directing attention now to FIG. 4A, another embodiment of the present invention is described, wherein signal deterioration is symmetric, and de-emphasis training can be achieved through the following methodology. At step 400, two 1394b PHY's speed negotiate and discover that they are both capable of a common data rate, e.g., S3200. At step 402, the two PHY's transmit synchronization training patterns to synchronize their respective receivers to the incoming bit patterns. In an embodiment, a phase locked loop (PLL) is locked into the received clock signal in order to recover the clock being used at the peer transmitter. This ensures that bits are received correctly. The two PHY's may start transmitting their respective clocks at a time interval up to a prescribed different (e.g., 42 msec apart), due to the asynchronous nature of the preceding speed negotiation algorithm.

After starting to send the clock training pattern, each PHY waits until a clock training pattern is received correctly from the other PHY. Each PHY then waits an additional time (e.g., 500 microseconds) to ensure that its PLL is stable. Then, at step 404, the de-emphasis training pattern is selected with a de-emphasis level to be tried. In an embodiment, a "bit 2" de-emphasis training sequence of alternating pairs of identical bits, such as 11001100, is selected as the first de-emphasis training pattern to be tried. In an embodiment, the "bit 2" sequence for is sent for approximately 512 to approximately 1024 bit times. Additional training patterns can include larger numbers of repeating bits, such as 111000111000 or 1111000011110000, and the like. These additional training patterns can be selected so that the number of repeating bits increases incrementally with each iteration of steps illustrated in FIGS. 4A and 4B. According to some embodiments, the selected training pattern can be sent initially with no de-emphasis.

At step 406, the de-emphasis training pattern is sent with the selected level of de-emphasis. The incoming bit stream is then analyzed at step 408. In one embodiment, the "eye" opening on the incoming bit stream is analyzed, and a determination is made as to whether the tried de-emphasis level is acceptable. In one variant, an acceptable level of de-emphasis can be determined from the receipt or absence of a NACK from the other PHY during the training pattern receipt period. In additional embodiments, analysis can include various digital and or analog techniques, such as applying an extra margin on the PHY's receiver before evaluating received signal quality.

At decision step 416, if all de-emphasis levels for the selected training pattern have not been tried, control transitions to step 418, where a different de-emphasis level is selected for the training pattern. In an embodiment, the amount of de-emphasis to be applied to the transmitter can be determined by analysis of the received signal, as it is known what training symbol the receiver is transmitting due to the symmetric nature of the algorithm (both ports send the same training sequence).

Control then loops back to step 406, where the training pattern is again tried, but this time with a different de-emphasis level. Returning to decision step 416, if all de-emphasis levels have been tried for the training pattern, control continues to decision step 412. If all patterns have not been sent, the different training pattern is selected and the de-emphasis level reset to its initial level at step 414. Control then returns to step 406, where the new training pattern is sent at the reset de-emphasis level. Returning to decision step 412, if all training patterns have been sent, control transitions to step 420 where an acceptable de-emphasis is selected, and normal 1394-compliant symbols are transmitted using the acceptable de-emphasis level at step 422.

In an alternative embodiment (FIG. 4B), a decision step 410 can be added to streamline the de-emphasis training process. In this embodiment, all training patterns are still sent, but a determination (decision step 410) is made as to whether a tried de-emphasis level is acceptable, and preempts further testing of the particular training pattern at additional de-emphasis levels.

Figure 8A:
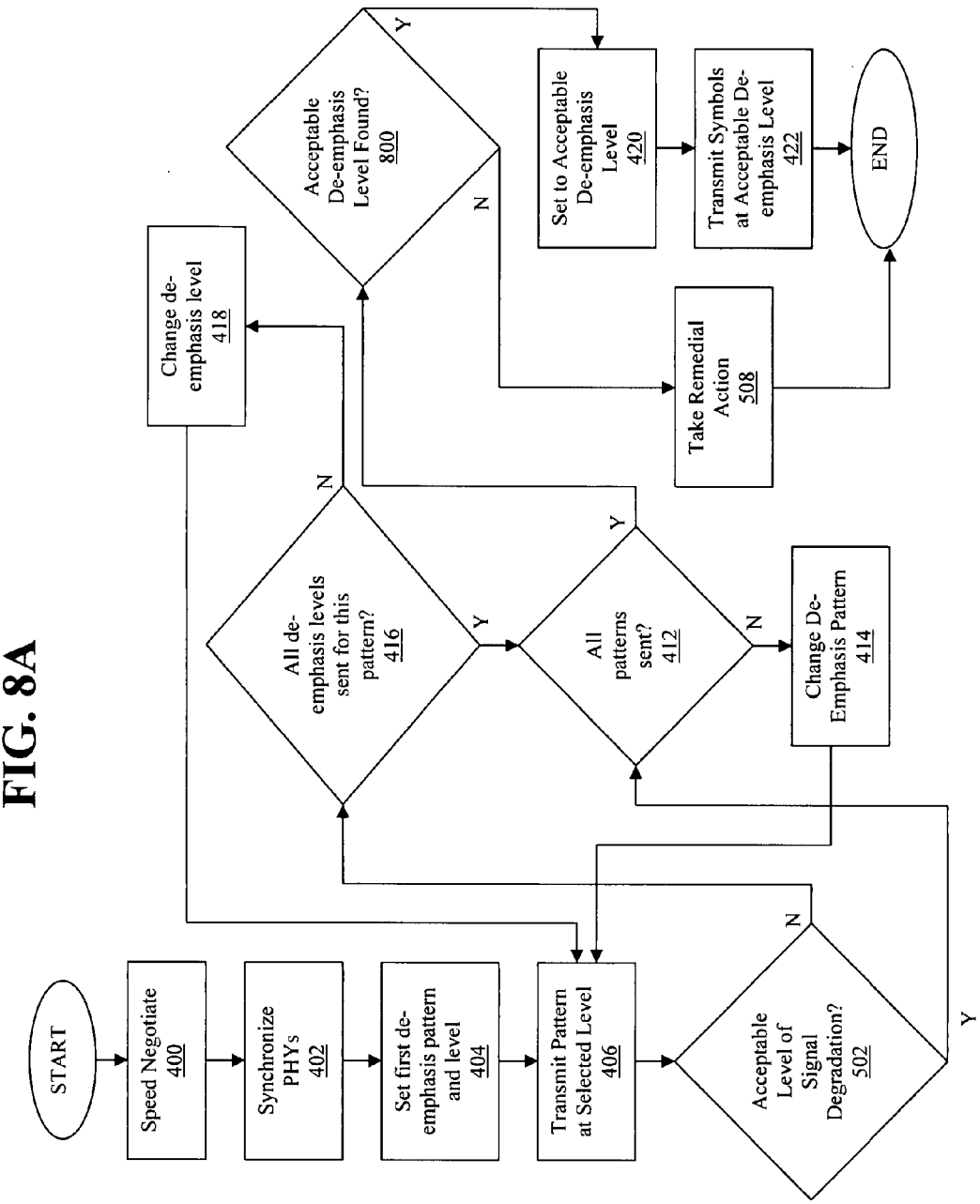
FIG. 8A is a flow diagram illustrating a sequence of de-emphasis training where remedial action is undertaken in the event of a transmission failure.
Figure 8B:
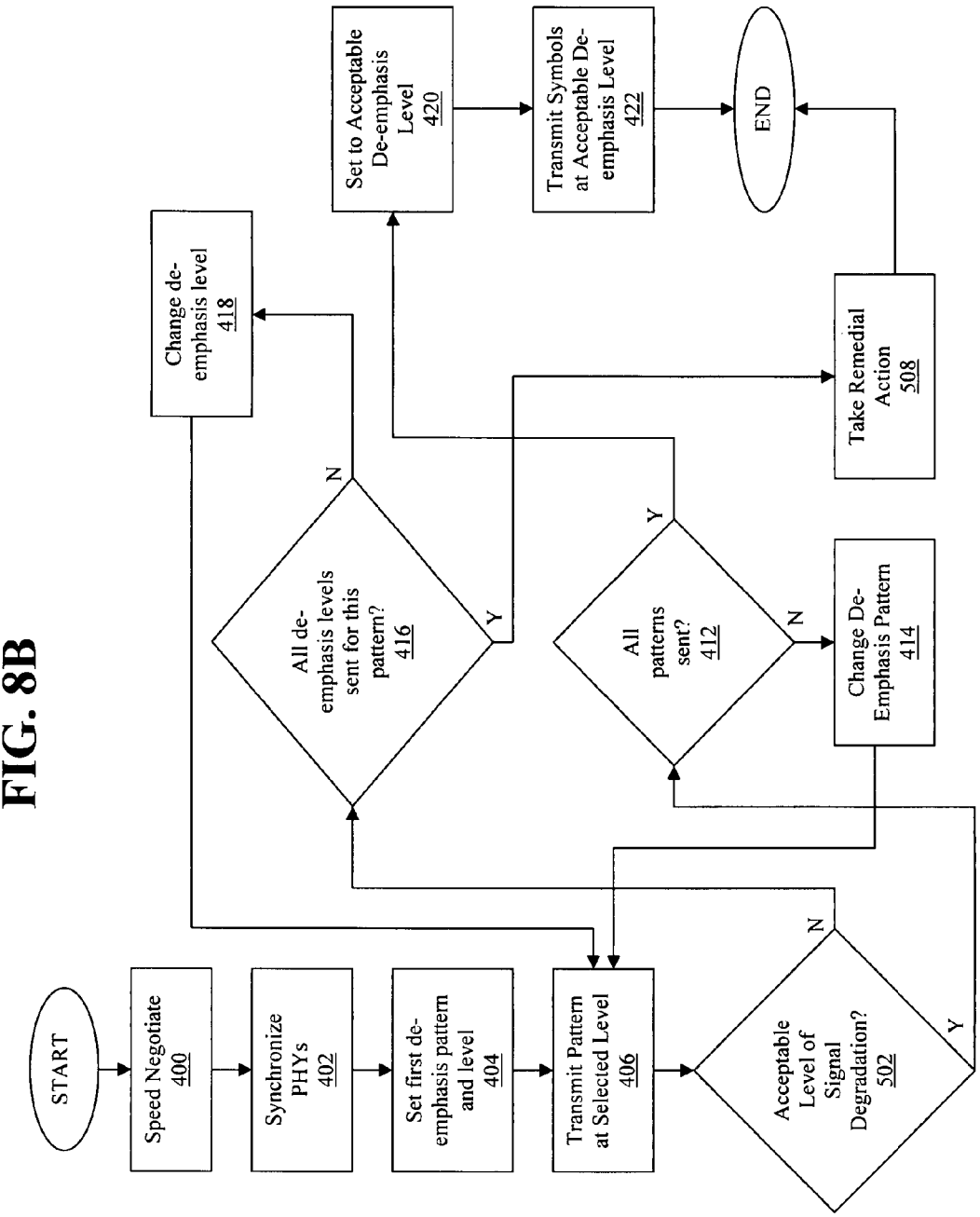
FIG. 8B is a flow diagram illustrating a sequence of de-emphasis training where the testing of additional training patterns is preempted in favor of remedial action in the event of a transmission failure.

According to certain embodiments, failure can be recognized at the end of the de-emphasis training methods. One embodiment of this process is illustrated by FIGS. 8A and 8B. Thus, when failure is recognized, appropriate remedial measures can be undertaken to address the failure. These measures include lowering the transmission speed, reporting the failure to management software, triggering a timeout interval, etc.

The procedure shown in FIG. 8A operates similarly to the one illustrated in FIG. 4A, except certain salient differences should be highlighted. At decision block 502, the receiving node determines whether the training pattern was received with an acceptable level of signal degradation. This determination can be made, for example, by analyzing the eye pattern or other such criteria in accordance with the process earlier described. After all patterns have been sent, control passes to decision block 800 (instead of step 420 as shown in FIG. 4a) where the receiving node (or the sending node in certain embodiments) determines whether an acceptable de-emphasis level had been found. If such a level was found, the transmitting node will set its transmission rate to this particular de-emphasis level at step 420, and subsequently transmit symbols at this rate at step 422. On the other hand, if a workable de-emphasis level was not found, remedial action is undertaken at step 508 to address the transmission failure. In one variant, the remedial action comprises retrying the above process at a slower transmission speed of (e.g., S1600).

FIG. 8B illustrates another embodiment of the present invention incorporating certain efficient preemptive aspects (such as those shown in FIG. 4B), while at the same time retaining the remedial mechanisms illustrated by FIG. 8A. In the embodiment shown by FIG. 8B, if all de-emphasis levels have been attempted for a certain pattern (step 416), and each one of the de-emphasis levels as applied to the current pattern yielded an unacceptable level of signal degradation (step 502), then remedial action may be undertaken (step 508) without the necessity of cycling through additional types of patterns (steps 412 and 414). It is also worth noting that with the above preemptive measures in place, the process shown in FIG. 8B can end after it is determined that all training patterns have been sent (decision block 412) (i.e., decision block 800 as seen in FIG. 8A is obviated). Then, once it is determined that all training patterns have been sent, the de-emphasis level can be set accordingly at the transmitting node (step 420) and then subsequently used by the transmitting node to transmit symbols to the receiving node at said level (step 422).

Figure 9:
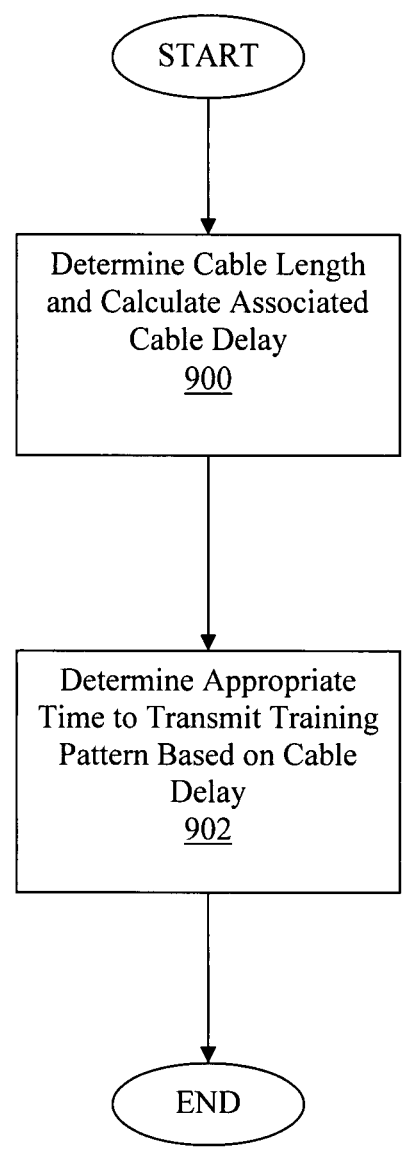
FIG. 9 is a flow diagram illustrating a transmission sequence where a node takes into account transmission delays associated with the connection before transmitting a training pattern to the other node.
Figure 10:
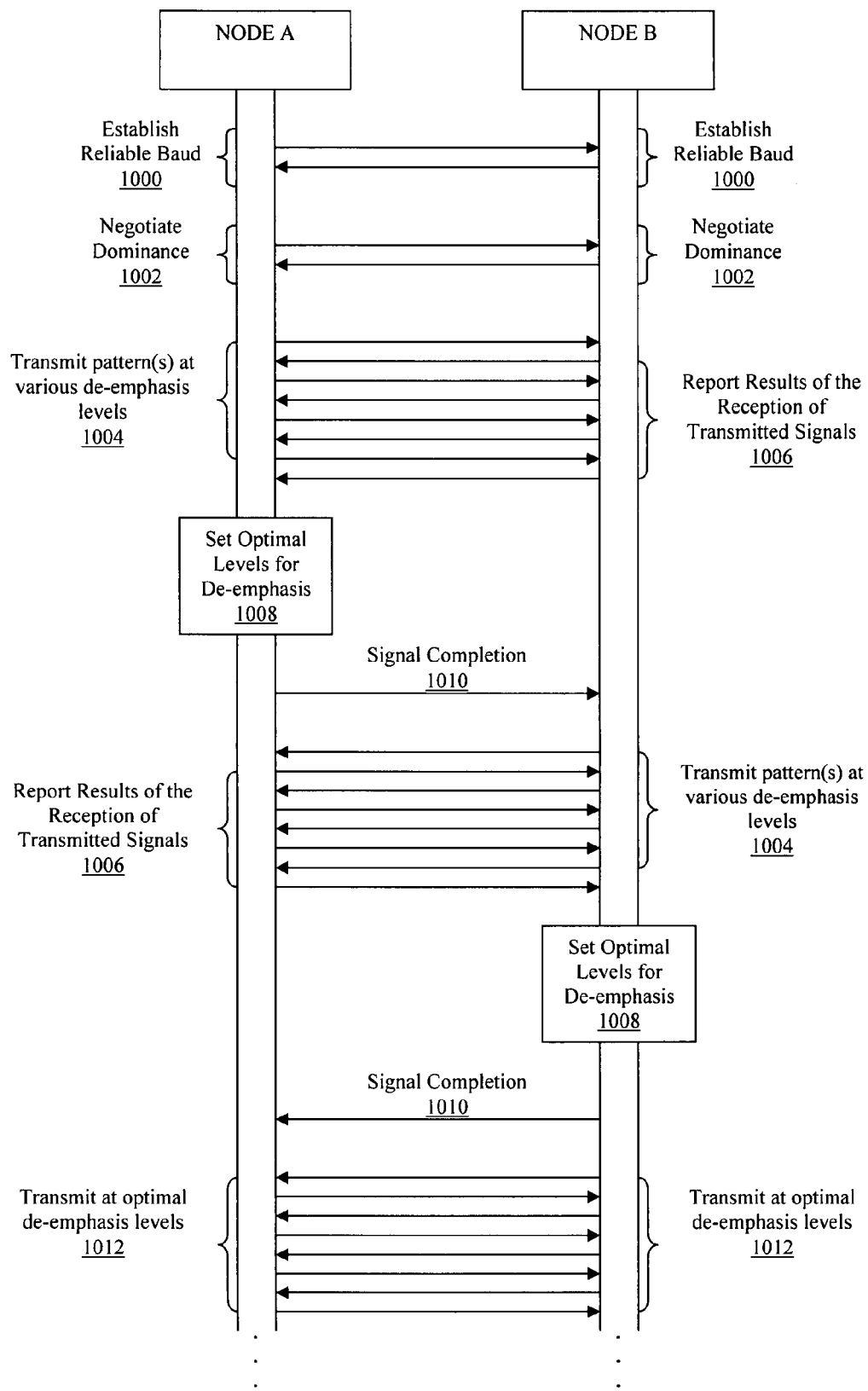
FIG. 10 is a sequence diagram illustrating a sequential calibration process where each node takes turns at performing de-emphasis training.

In various embodiments, such as the one depicted by FIG. 9, the present invention also provides calculations for cable length and resulting round trip delays (step 900). For example, while the 1394b cable/connector specification for the IEEE 1394b Standard supports an inexpensive 4.5 m cable, various users will desire longer cables with a different construction that still meet the same cable budget parameters. Allowing for a 10 m cable delay, where a signal travels at a rate of 5 ns per meter, the end-to end delay is of the order of 50 ns in each direction. Thus, by this example, 200 bits at S3200 can be in flight on the cable at any given time. The time allowed in the 1394b Standard for phase lock loop (PLL) synchronization (plus other negotiation) is approximately 1 ms. The speed negotiation algorithm operates at 25 Hz and is asynchronous. Thus, one node can decide to start sending training symbols some 42 msec before the peer port starts sending its own training symbols and analyzing incoming training symbols (step 902).

Note that the PHY's receiver always knows what the transmitter is transmitting any given moment in time to within a degree of accuracy defined by round trip delay. This is partly a property of what is determined from analyzing the incoming stream (the actual pattern of 1's and 0's), and partly (the de-emphasis applied) inferred from what the receiving node is receiving.

According to other embodiments, rather than trying to train ports in both directions at the same time, the two ports at either end of a new connection can instead take turns, or utilize other multiple access schemes. These embodiments provide greater flexibility to the designer of the transmitter, and avoid issues of trying to interpolate a "good/bad" feedback in the middle of a training pattern. The ports do this in one embodiment by executing the following sequence of acts, as shown by the sequence diagram of FIG. 10, and described in detail by the following steps:

1) Establishing a connection between the nodes known as the "reliable Baud"—that is, establish a rate that is slower than the rate that requires de-emphasis (step 1000).

2) Negotiating dominance between the two nodes, whereby one of the nodes becomes dominant and takes the first turn as transmitter, while the other nodes becomes sub-dominant and serves as the receiver (step 1002).

3) Transmitting from the dominant node at high speeds, varying the levels of de-emphasis as well as other parameters such as rise time and fall time (step 1004). This can be accomplished, for example, by the procedures illustrated by FIGS. 5-7, 8A, and/or 8B.

4) Having the subdominant node continuously report the results of its reception of the signal (step 1006).

5) Having the dominant node decide on the basis of the feedback received from the subdominant node the optimal values for de-emphasis and any other parameters (step 1008).

6) Having the dominant node signal its completion of its half of the training (step 1010).

7) Repeating steps 3-6, with the roles of the dominant and subdominant node switched.

8) When the subdominant node reports that it has completed training, then both nodes may start signaling at high speed using the appropriate values for de-emphasis (and other parameters if appropriate) as determined during the training (step 1012).

As the above sequential calibration process illustrates, once a Firewire cable is connected to the system (e.g., in the S1600 or S3200 vintage) the very low level PHYs begin a calibration routine. According to this routine, the nodes must initially decide which of them is going to perform calibration first. According to one embodiment, this is accomplished by having each node generate (e.g., via a pseudo-random number generator, LFSR, or the like) and transmit a random number to the other node. In one variant, the node which generated the lower (or alternatively higher) number becomes the dominant node (i.e., the transmitting node), while the other node becomes the subdominant (receiving) node. If the numbers generated by each node happen to be identical, the process repeats until one number is lower (or higher).

According to certain embodiments, the dominant node sends a data pattern at a certain de-emphasis level, while the subdominant node looks at a BERR (bit-error rate) register and returns its results every n milliseconds. In many embodiments, n is fixed (for example, n can be 50 milliseconds). The subdominant node returns the BERR rate at a signaling rate that has already been established to work.

The dominant node then steps through and attempts transmission according to various settings, receiving a BERR rate for each one. According to some embodiments, when the dominant node has finished testing at each of these settings, it signals to the subdominant node at a low transmission rate (for example, the S400 rate). After the procedure has been completed with respect to one of the nodes, the roles are reversed (i.e., the dominant node becomes the subdominant, and vice versa), and the process then repeats.

Note that in some embodiments of the invention, the dominant node selects its settings based on the returned BERR data. It does not rely on special circuits in the subdominant node or an agreed-to calibration routine, as it utilizes its own routine.

In certain variants, after the dominant node sends a pattern to the subdominant node and then subsequently asks it for the BERR rate, each node is given an upper time limit of approximately of 0.5 to 1 seconds in order to be ready for a subsequent action.

Note also that when a dominant node varies the de-emphasis and rise/fall times based on the BERR feedback, this allows innovation between different designs, advantageously providing the system with more robustness over non-ideal cables. For example, S3200 compliant cables can be utilized instead of non-compliant S800 cables, longer cables, or more flexible cables with more loss.

Per some embodiments of the invention, the PHY link reports to upper layers the maximum speed that is deemed to be useable, conforming with certain BERR criteria as guidelines for what is expected. In some embodiments, these criteria are correlated to a BER of 1E-12 (1 bit error in 1E12 bits). Note that such approach has the great advantage of not requiring any special "margin testing" in the subdominant node (such as receiving "off center" from the center of the eye).

In some cases, it may be necessary to synchronize twice-first, at a low transmission rate to allow the necessary dominance negotiation and BERR feedback, and second, at the target rate (such as S3200). This, however, poses no problem, since the "max port speed" register is provided to control the maximum speed at which to synchronize. In one embodiment, for BERR feedback, the subdominant port simply sends the current value of the error counter continuously, as it is required to transmit some form of response. Note also that the error counter may be designed to auto-wrap (currently it is specified to stick at 255 until read by software). Given that the specified BERR is 1E-12, this equates to a bit error every 250 seconds at S3200.

In some embodiments, the dominant and subdominant nodes can each perform their own margining, utilizing methods of "software margining" to test a low amplitude, for example and with various de-emphasis settings; a determination is then made by the software process as to the amplitude where errors begin to appear. Such methods may also increase the deterministic jitter. See, e.g., U.S. Pat. No. 6,718,497 to Whitby-Strevens issued Apr. 6, 2004 entitled "Method and apparatus for generating jitter test patterns on a high performance serial bus", incorporated herein by reference in its entirety, regarding jitter test pattern generation, calculations and control. A variety of different methods can be used to achieve the foregoing purposes also, such methods being well known to those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method for use by a first device in communication with a second device via a serial bus, said method comprising:

transmitting a plurality of symbols to the second device during a first interval;

monitoring for an interrupt during the first interval, the interrupt indicating to the first device that at least a portion of the plurality of symbols degraded during transmission to the second device;

when the interrupt is received at the first device during the first interval, halting the transmitting of any remainder of the plurality of symbols and attenuating a signal strength associated with data transmissions from the first device to the second device;

where said method is executed repeatedly at the first device for the shorter of a maximum number of attempts allowed before a remedial action is taken, and a number of attempts necessary before the first device does not receive an interrupt during the first interval; and wherein the remedial action comprises having the first device lower a transmission speed associated with data transmissions between the first device and the second device.

2. The method of claim 1, wherein the plurality of symbols comprises a stream of bits.

3. The method of claim 1, wherein said method is executed repeatedly at the first device for up to a maximum number of attempts, wherein said first device progressively increases a symbol count associated with the plurality of symbols after each attempt where the first device does not receive the interrupt from the second device during the first interval.

4. The method of claim 1, wherein the remedial action comprises reporting a transmission failure to a software process.

5. The method of claim 1, wherein the remedial action comprises triggering a timeout interval.

6. The method of claim 1, wherein the interrupt comprises a designated symbol indicating a negative acknowledgement.

7. The method of claim 6, wherein the designated symbol is distinguishable from each symbol in the plurality of symbols.

8. The method of claim 7, wherein the designated symbol comprises a series of alternating bits.

9. The method of claim 1, wherein the serial bus comprises a high-speed serial bus complaint with at least one of an IEEE-1394a or IEEE-1394b standards.

10. A method for use by a second device in communication with a first device via a serial bus, said method comprising:

receiving one or more symbols of a transmission of a plurality of symbols from the first device at a first emphasis level during a first interval;

determining during the first interval whether at least a portion of the plurality of symbols has degraded during transmission;

when the at least portion of the plurality of symbols has degraded during transmission, transmitting an interrupt to the first device before the transmission of a plurality of symbols has been completed, wherein the interrupt causes the first device to end any remaining transmission of the plurality of symbols and to transmit one or more subsequent transmissions at a second emphasis level;

where the first device is configured to attempt transmissions for the shorter of a maximum number of attempts allowed before a remedial action is taken, and a number of attempts necessary before the first device does not receive an interrupt during the first interval; and wherein the remedial action comprises having the first device lower a transmission speed associated with data transmissions between the first device and the second device.

11. The method of claim 10, wherein the plurality of symbols comprises a stream of bits.

12. The method of claim 10, wherein said determining whether the plurality of symbols has degraded during transmission comprises utilizing a mechanism that identifies inter-symbol interference.

13. The method of claim 12, wherein said mechanism comprises utilizing an eye representation, the eye representation that records an amount of inter-symbol interference associated with the transmission of the plurality of symbols to the second device.

14. The method of claim 10, wherein the interrupt comprises a designated symbol indicating a negative acknowledgement.

15. The method of claim 14, wherein the designated symbol is distinguishable from each symbol in said plurality of symbols.

16. The method of claim 14, wherein the designated symbol comprises an equal number of high and low bits.

17. The method of claim 10, wherein the first interval comprises the time it takes for the second device to receive approximately half of the plurality of symbols from the first device.

18. The method of claim 10, wherein the first interval is determined by a round-trip time associated with transmissions from the second device to the first device, the round-trip time comprising a time for the first device to receive a test signal from the second device plus a time for the second device to receive a test signal response from the first device.

19. The method of claim 18, wherein the round trip time further comprises time associated with one or more clock cycles associated with the serial bus.

20. The method of claim 10, wherein the degradation comprises inter-symbol interference, and the serial bus comprises a high-speed serial bus complaint with at least one of an IEEE-1394a or IEEE-1394b standard.

\* \* \* \* \*